United States Patent [19]

Yelloz

[11] 4,137,833
[45] Feb. 6, 1979

[54] COMBINATION ESPRESSO AND AROMATIC COFFEE MAKER

[76] Inventor: Roni P. Yelloz, 65-04 161st St., New York, N.Y. 11365

[21] Appl. No.: 807,542

[22] Filed: Jun. 17, 1977

[51] Int. Cl.² ............................................ A47J 31/54
[52] U.S. Cl. .................................................... 99/293
[58] Field of Search ................. 99/291, 293, 300, 281, 99/283, 302 R, 316

[56] References Cited

U.S. PATENT DOCUMENTS 1,185,073   5/1916   Ehrheart .............................. 99/300

FOREIGN PATENT DOCUMENTS 920387   5/1961   United Kingdom ...................... 99/291

*Primary Examiner*—Robert W. Jenkins
*Attorney, Agent, or Firm*—Constantine A. Michalos

[57] ABSTRACT

A coffee maker comprising a main or external tank for containing water and steam under pressure, a secondary or internal tank in the main tank for containing water under pressure to be used in making espresso, and a heating element in the main tank adjacent to the secondary tank for heating the water in the main tank and maintaining the water in the secondary tank at a substantially constant temperature. An aromatic coffee water supply is also maintained in a separate tank to feed a shower arrangement for making aromatic coffee. Alternatively, the shower can be fed directly from the main or external tank of the espresso-making arrangement. Once heated to a constant temperature, the water in the secondary or interior tank can be supplied to a group unit through a valve arrangement for injection through a quantity of ground espresso coffee to form the espresso coffee drink. Pressure relief valves are connected between the main and secondary tanks and a drain to maintain the pressures in the respective tanks at desired levels and prevent damage to the device.

3 Claims, 1 Drawing Figure

U.S. Patent  Feb. 6, 1979  4,137,833
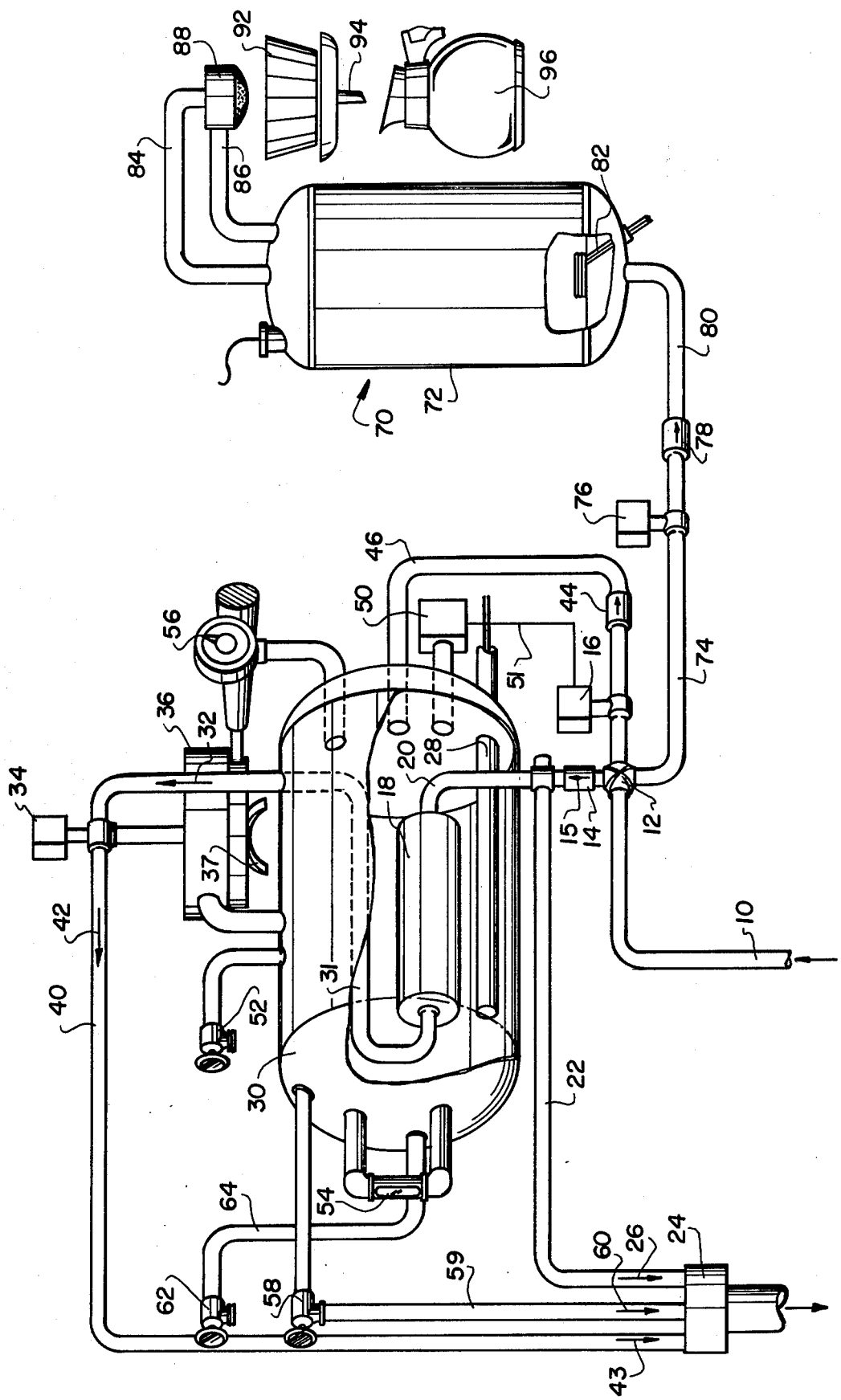

COMBINATION ESPRESSO AND AROMATIC COFFEE MAKER

BACKGROUND OF THE INVENTION

1. Field of the Invention

In general, the present invention relates to coffee making devices and, in particular, to a new and useful combination espresso and aromatic coffee making device utilizing a double tank arrangement to provide steaming hot water for injection into espresso coffee grounds at a constant temperature.

2. Description of the Prior Art

The making of coffee by the injection of hot water into specially-mixed coffee grounds to produce a coffee beverage has been known and widespread in Europe for hundreds of years. In the early nineteen hundreds, mechanical devices were introduced which made this coffee beverage instantly. The maintenance of the water supplied in the making of this so-called "espresso", or express coffee, at a constant high temperature and pressure, has always been a critical consideration as the flavor of the coffee can be greatly influenced by these factors and by the speed at which the steaming water is passed through the coffee grounds.

In addition to the importance of constant temperature and pressure in the water supplied for making espresso coffee, the growing popularity of this type of coffee in the United States has required restaurants and the like to maintain separate machinery for the making of espresso coffee and the so-called aromatic or "American" coffee.

The present invention provides a convenient and economical device for making espresso coffee, as well as the various hybrids grouped under the generic term of cappuccino and aromatic coffee.

SUMMARY OF THE INVENTION

The present invention is a coffee making device which incorporates an espresso-making arrangement having a feature for providing steaming water at substantially constant temperature and pressure and an aromatic coffee-making arrangement that can be supplied with water either from a general water supply which also feeds the espresso-making arrangement, or from a main tank of the espresso-making arrangement.

The espresso-making arrangement comprises a main or external pressure tank that can be supplied with water from a general water supply or tap, through a solenoid valve and one-way valve connected in series. The main tank has a heating element, such as an immersible resistance wire-type heater therein, at a position below the water level in the tank. The water in the main tank is usually maintained at about the two-thirds full level. The main tank is further provided with pressure gauge and level control mechanisms to monitor and control the pressure and water level in the main tank. A smaller secondary or internal tank is provided inside the main tank and is also connected to the water supply. The connection is effected through a one-way valve and a pressure relief valve connected in series. The pressure relief valve serves to prevent the buildup of pressure beyond the working pressure of the secondary tank.

Steam can be tapped directly from the main tank to be used in making the scalded milk used in cappuccino, or can be supplied to an espresso coffee group unit to preheat it in preparation for the coffee-making process.

Steaming hot water under pressure is supplied through a solenoid valve and a second pressure relief valve, to the center of the group unit. This water is injected through the coffee in the group to make the espresso beverage thereunder.

An aromatic coffee tank is also supplied with water either from the general water supply or tap, or from the main tank of the espresso coffee arrangement. Heated water from this tank is supplied through a sprayer nozzle to aromatic coffee held in a filter to make aromatic or "American" coffee.

An object of this invention is to provide a single device for making espresso and aromatic coffee.

Another object is to provide an espresso-making device that provides steaming hot water at substantially constant temperature and pressure.

Another object of the invention is to provide a coffee maker that is simple in design, rugged in construction and economical to manufacture.

These and other objects and features of the invention are pointed out in the following description in terms of the embodiments thereof which are shown in the accompanying drawing. It is to be understood, however, that the drawing is for the purpose of illustration only and is not a definition of the limits of the invention.

BRIEF DESCRIPTION OF THE DRAWING

The only FIGURE of the drawing is a perspective side view showing the espresso and aromatic coffee-making device in accordance with a preferred embodiment of the invention.

DESCRIPTION OF THE PREFERRED EMBODIMENT OF THE INVENTION

In the FIGURE, the espresso and aromatic coffee maker comprises a water inlet 10 supplied with water as sown by arrow 11 from a filter and pump unit or directly from a water tap (not shown). It is advisable to provide a filter to prevent dirt and clogging of the various valves within the system.

The water is then divided by a cross fitting 12 and passes a one-way valve 14 as shown by arrow 15 pressure controlled by a pressure relief valve 16. The water is then directed to an internal or secondary tank 18 by conduit 20. The relief valve 16 prevents excess pressure from entering the internal or secondary tank 18 and in addition prevents any excessive buildup of pressure therein. Valve 16 redirects the overpressure water from tank 18 through conduit 22 and out of drain 24, as shown by arrow 26. The pressure within the internal tank therefore remains constant at between 80 and 90 pounds.

The water in tank 18 is then heated by an electric heater or heating element 28 through hot water within external or main tank 30; as hereinafter described. By this method, the water temperature within internal tank 18 remains constant.

The heated water from internal or secondary tank 18 is then directed through conduit 31 at a constant temperature, as shown by arrow 32, to a solenoid valve 34. From the solenoid valve the hot water is then directed to the group unit 36 for use in producing espresso coffee through the usual espresso filter arrangement 37 to make one or two cups of espresso coffee. In known fashion, expresso coffee is supplied to the group unit 36 and the hot water is directed through this coffee from the line 31 to form the espresso coffee drink.

Any excess water (any buildup of water) in the conduit 31 to the solenoid valve 34 and the group 36 is diverted by the solenoid 34 to conduit 40, as shown by arrows 42 and 43 to the drain 24.

The water in internal tank 18 is heated by means of the external or main tank 30 which receives its water from the conduit 10, past the solenoid valve 16 and past a one-way valve 44 through conduit 46. The water within tank 30 is heated by the submergible electrical heating element 28 which produces hot water. The water in main tank 30 is maintained at substantially the two-thirds-full level. A pressure regulator 50 connected to the tank 30 regulates pressure within the external tank by means of the solenoid valve 16. The valve 16 is shown connected by line 51 to the pressure regulator 50. The pressure is thus maintained at between ten and fifteen pounds per square inch. Any built-up steam in tank 30 is utilized through the manual valve 52 to heat up any liquid and, more specifically, in scalding milk to make cappuccino.

The external tank 30 also includes water gauge 34 and pressure gauge 56. Further, it includes a pressure relief valve 58 which directs any excess steam pressure through conduit 59, as shown by arrow 60, to the drain 24. Further, we have a hot water outlet 62 directed through conduit 64 for use for any purpose (for tea, etc.).

As shown herein, internal tank 18, with the pipe elements 31, produces a constant pressure of hot water to give a more homogeneous and consistently better tasting espresso coffee beverage.

Further, with this invention we present a combination of the use of the espresso-/cappuccino-producing machine with an aromatic, automatic, drip-type coffee machine 70. The aromatic drip-type coffee machine 70 comprises a tank 72 which receives tap or filtered water from the conduit 10 past the cross-fitting 12, through conduit 74, controlled by solenoid valve 76 through one-way valve 78 and conduit 80. This is also heated by a submergible heating element 82. The tank 72 provides hot water which is directed from the conduits 84 and 86 to shower head 88 and nozzle 90, respectively. The hot water is directed from the shower head 88 and nozzle 90 to filter element 92 which contains aromatic coffee. The coffee is then directed through a spout 94 to a drip (Silex) coffee container 96.

In the alternative arrangement (not shown), hot water can be provided from the main or external tank 30 to tank 72. In a second alternative arrangement, heated water can be supplied to the shower head 88 and nozzle 90 directly from the main or external tank 30.

While the present invention has been described in preferred embodiments, it will be obvious to those skilled in the art that variour modifications can be made therein within the scope of the invention.

What is claimed is:

1. A coffee maker for making espresso as well as aromatic coffee comprising, a main tank, water supply means for feeding water to said main tank and maintaining water in said main tank to a predetermined level, a secondary tank operably receiving water from said water supply means positioned within said main tank and below said predetermined water level, a heating element within said main tank and spaced from said secondary tank for heating the water within said main tank to produce steam and for indirectly heating the water in said secondary tank, a pressure relief valve associated with said secondary tank for maintaining a predetermined pressure on water in said secondary tank, a conduit connected in series with said secondary tank and extending partially within said main tank, an espresso group unit for containing espresso coffee grounds connected to said conduit, heated water from said secondary tank being directed through said conduit at constant temperature and pressure and to said espresso coffee group unit through the espresso coffee grounds therein to form espresso coffee, and a steam tap in said main tank above said water level therein for tapping steam from said main tank whereby water directed through the espresso coffee grounds to form espresso coffee is supplied at substantially constant temperature and pressure and steam may separatly be tapped from said main water tank to skoal milk in forming cappuccino.

2. The coffee maker claimed in claim 1 further comprising pressure relief valve means connected to said secondary tank means operably maintaining the water in said secondary tank at a constant predetermined pressure.

3. A coffee maker according to claim 1 further including a second tank associated with said main tank and connected to said water supply means and fillable therefrom to a predetermined level, a second heater in said second tank for heating water therein to form heated water, and a nozzle connected to said second tank for supplying a shower of water usable to form drip type aromatic coffee.

* * * * *